No. 764,490. PATENTED JULY 5, 1904.
J. E. McNEELY.
VALVE GEAR.
APPLICATION FILED SEPT. 11, 1903.
NO MODEL.

Witnesses
R. P. King.
Nellie Allemong.

Inventor
John E. McNeely
By V. H. Lockwood
Attorney.

No. 764,490. Patented July 5, 1904.

UNITED STATES PATENT OFFICE.

JOHN E. McNEELY, OF INDIANAPOLIS, INDIANA, ASSIGNOR OF ONE-HALF TO HENRY R. COBURN, OF INDIANAPOLIS, INDIANA.

VALVE-GEAR.

SPECIFICATION forming part of Letters Patent No. 764,490, dated July 5, 1904.

Application filed September 11, 1903. Serial No. 172,799. (No model.)

*To all whom it may concern:*

Be it known that I, JOHN E. MCNEELY, of Indianapolis, county of Marion, and State of Indiana, have invented a certain new and useful Valve-Gear; and I do hereby declare that the following is a full, clear, and exact description thereof, reference being had to the accompanying drawings, in which like figures refer to like parts.

This invention relates to improvements in the valve-gearing of steam-engines, especially of the Corliss type.

The object of this invention is to do away with the steam-hook and the spring actuating the steam-hook, because of the uncertainty of the action of the steam-hook due to the spring and in order to make the action of the valve more certain and reliable. The spring-controlled steam-hook is liable by reason of the uncertain action of the spring not to hook up after it has been released. This object is accomplished by the mechanism hereinafter explained and which will be understood from the accompanying drawings and the following description and claims.

Figure 2:
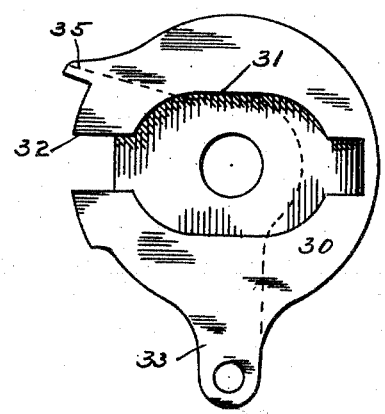
Figure 1:
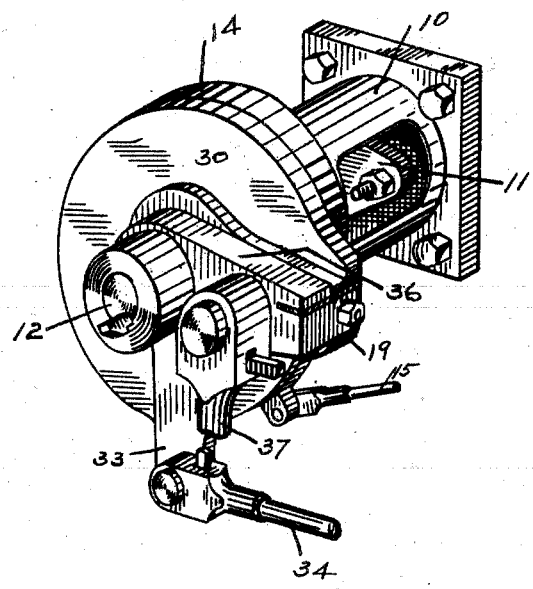
Figure 3:
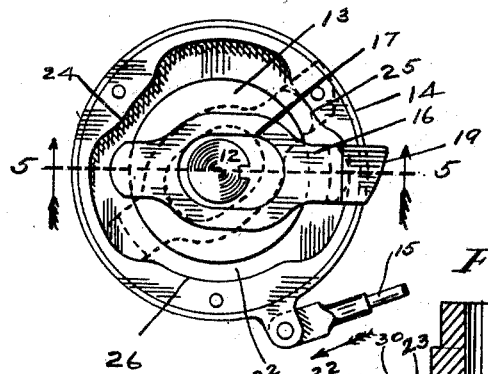
Figure 4:
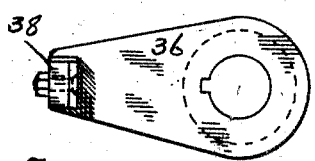
Figure 5:
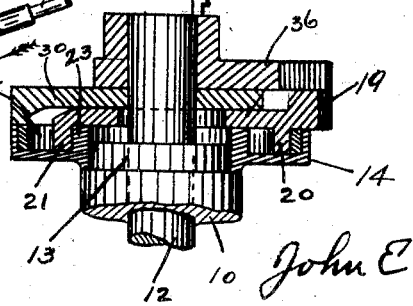

In the drawings, Figure 1 is a perspective view of an admission-valve mechanism with parts broken away. Fig. 2 is an inside elevation of the crank-plate which is operated from the wrist-plate. Fig. 3 is an outside elevation of the cam-plate which is actuated by the governor and the crank-trip mounted in connection therewith, dotted lines showing altered positions of the parts. Fig. 4 is a detail view of the crank with which the dash-pot is connected. Fig. 5 is a horizontal section on the line 5 5 of Fig. 3.

In detail 10 is a bonnet that is secured to the cylinder.

11 is the bearing for the valve stem or shaft 12, that extends into the cylinder and operates the valve therein. A bearing 13 is integral with the outer end of the bonnet 10, and upon it there is mounted the cam-plate 14, as shown in Fig. 5. The bearing 13 serves not only as means for mounting the plate 14, but also as a bearing for the valve stem or shaft 12. Hence the plate 14 turns independently of the stem or shaft 12. Said plate 14 is oscillated by a governor-rod 15. A trip 16 is mounted adjacent said cam-plate 14 and has a central opening 17 in it, whereby it surrounds the stem or shaft 12, said opening being wide enough to permit the trip to move freely on the stem or shaft and being elongated in a direction in line with the length of the trip, whereby the trip may have longitudinal movement. The form of the trip 16 in longitudinal section appears in Fig. 5. At its outer end it has a nose 19, which is sharp at one corner and beveled away from said corner, and said nose is wider than the main body of the trip. There are also two extensions 20 and 21 from the other or inner side of the trip, as seen in Fig. 5, that extend into the recess 22 in the plate 14. The outer and inner surfaces of said extensions 20 and 21 are preferably curved. A collar 23 forms the inner wall of the recess 22 of the plate 14, as seen in Fig. 5, and the extensions 20 and 21 of the trip play between said collar and the outer wall of the recess 22 during the longitudinal movement of the trip. Cams 24, 25, and 26 are provided in the plate 14 in the outer wall surrounding the recess 22, so that when the plate 14 is oscillated by the governor-rod 15 these cams will actuate and regulate the movement of the trip 16. The cam 24 forces the trip outward by engaging the extension 21 on said trip. The cam 25 forces the trip inward or to the left, as shown in Fig. 3. The cam 26 is a safety-cam that holds the trip from catching the steam-crank if the governor fails.

The plate 30 is mounted upon the stem or shaft 12 outside of and against the cam-plate 14 and the trip 16. It is cut out at 31 to provide a place for the trip 16, for, as seen in Fig. 5, the trip 16 lies against the cam-plate 14 rather than within it. The nose 19 of the trip operates in a notch 32 in the periphery of the plate 30, and the proportions and parts are such that when the trip has been moved outward its nose will extend beyond the periphery of the plate 30 and when the trip has been moved inward it will not extend beyond the periphery of said plate 30. The plate 30 has a crank 33, with which a rod 34, that extends from the wrist-plate of the engine, is connected, so that the wrist-plate oscillates the plate 30. Said plate 30 also has a lug 35 extending outward from its periphery.

Upon the outer end of the shaft or stem 12 the crank 36 is keyed. A rod 37, which is pivotally connected with it, runs to and is controlled by the dash-pot below. Said crank 36 lies against the outer surface of the plate 30, but has on its outer end a rearwardly-extending lug 38, which is engaged by the lug 35 from the plate 30, so that if the dash-pot for any reason fails to work said crank will be actuated by the plate 30 from the wrist-plate.

In normal operation the oscillation of the plate 30 from the wrist-plate will cause a similar oscillation of the trip 16 and said trip will be forced inward by the releasing-cam 25 and the steam shut off, and the opposite throw of the plate 30 and trip 16 will cause the cam 24 to force the trip outward, so that it will each time pick up the crank 36 and through it and the stem or shaft 12 open the valve in the cylinder. If the speed becomes too great, the governor, through the rod 15, will move the cam-plate 14 somewhat in the direction of the arrow shown in Fig. 3, which will move the releasing-cam 25 downward somewhat, so as to throw the trip 16 sooner than before, and consequently close the valve in the cylinder sooner than before. In other words, the position of the releasing-cam 25 determines the time when the steam-valve is closed, and the position of that releasing-cam is controlled by the governor through the rod 15 and cam-plate 14.

The safety-cam 26 is provided for service in case the governor-belt should break or some similar accident should occur. It co-operates with the cut-out portion or recess on the opposite side of the disk between the cams 24 and 25. The cam 26 when the disk 14 is moved somewhat in the direction opposite to that in which the arrow points in Fig. 3, as would be the case when the governor should stop operation, would throw the trip inward out of engagement with the crank 36 in the lower part of the oscillatory movement of the nose of the trip. It would then fail to lift the steam-crank at all, and therefore the valve in the cylinder would be kept closed and the engine be prevented from racing until the accident should be remedied.

What I claim as my invention, and desire to secure by Letters Patent, is—

1. In an engine valve-gearing, the combination with a crank, of a sliding trip oscillated from the wrist-plate, and a governor-controlled cam mechanism for sliding said trip into and out of engagement with said crank for actuating and releasing the latter.

2. In an engine valve-gearing, the combination with a crank, of a sliding trip oscillated from the wrist-plate, and a governor-controlled cam-plate mounted beside said sliding trip for sliding said trip into and out of engagement with said crank for actuating and releasing the latter.

3. In an engine valve-gearing, the combination with the valve-shaft and a crank thereon, of a governor-controlled cam-plate mounted concentric with said valve-shaft, and a trip mounted adjacent said cam-plate so as to be radially slidable and oscillatory by the wrist-plate, said cam-plate being provided with a cam for moving said trip outward into engagement with said crank, and another cam for withdrawing said trip and releasing said crank.

4. In an engine valve-gearing, the combination with the valve-shaft and a crank thereon, of a disk mounted on the valve-shaft adjacent said crank that is actuated by the wrist-plate, a trip radially slidable on said shaft which is engaged and oscillated by said disk, and a governor-controlled cam-plate mounted concentric with said valve-shaft and adjacent the trip and provided with cams for moving said trip into and out of engagement with said crank.

5. In an engine valve-gearing, a valve-shaft, a crank thereon with a laterally-extending lug on its end, a dash-pot connection with said crank, a disk loosely mounted on the valve-shaft adjacent said crank and having a radially-extending recess in it, a trip loosely carried in said recess and adapted when forced outward to engage the lug on the crank, a wrist-plate connection with said disk for oscillating it and said trip, a cam-plate mounted concentric with said valve-shaft adjacent said trip and provided with cam-surfaces for moving the trip in either direction, and a governor connection with said cam-plate for oscillating it so as to change the position of the cams on said plate with reference to said trip.

6. In an engine valve-gearing, a valve-shaft, a bonnet in which said shaft has bearing, said bonnet having an enlarged bearing on its outer end, a cam-plate mounted on said enlarged bearing concentric with said shaft and recessed in its outer surface so as to leave a pair of oppositely-located inwardly-extending cams both of which are on the same side of said shaft, a governor connection with said cam-plate for turning the same slightly, a trip adjacent the outer face of said cam-plate and consisting of a bar with a centrally-elongated opening through which the valve-shaft extends and having two lateral extensions into the recess in the side of the cam-plate that are adapted to be engaged by one or the other of the cams in said plate, a disk loosely mounted on said shaft adjacent the cam-plate, and with a recess in its side in which said trip may lie and be movable and with its periphery within the outward limit of movement of the trip, a wrist-plate connection with said disk for oscillating it and said trip, a crank secured on said valve-shaft adjacent said disk with the end thereof adapted to be engaged and lifted by said trip when it is moved outward, and a dash-pot connection with said crank.

7. In an engine valve-gearing, the combination with a crank, of a sliding trip oscillated from the wrist-plate, and a governor-controlled cam mechanism for sliding said trip into and out of engagement with said crank for actuating and releasing the latter, said cam mechanism having a safety-cam which withdraws said trip from engagement with said crank when the governor ceases to act.

8. In an engine valve-gearing, a crank, a sliding trip for actuating said crank that is oscillated by the wrist-plate consisting of a bar with a pair of oppositely-located extensions on one side thereof, and a governor-controlled cam-plate mounted adjacent said trip to receive said extensions and having three cams for engaging said extensions and moving said trip, two of said cams being on one side of the center of said disk for moving said trip outward and returning the same, and a third cam on the opposite side of the center of said disk for forcing said trip inward and holding it out of engagement with said crank when the governor ceases to operate.

9. In an engine valve-gearing, the combination with a valve-shaft and a crank thereon, of a disk loosely mounted on said valve-shaft adjacent said crank, said disk having a lug adapted to engage said crank and move it to close the valve, and a wrist-plate connection with said disk for oscillating it.

In witness whereof I have hereunto affixed my signature in the presence of the witnesses herein named.

JOHN E. McNEELY.

Witnesses:
NELLIE ALLEMONG,
V. H. LOCKWOOD.